United States Patent
Wu et al.

(10) Patent No.: US 6,849,296 B2
(45) Date of Patent: Feb. 1, 2005

(54) LEAKAGE FREE CERAMIC FILMS FOR POROUS SURFACES

(75) Inventors: Zhonglin Wu, Bettendorf, IA (US); Scott R. Sehlin, Bettendorf, IA (US)

(73) Assignee: Carleton Life Support Systems, Inc., Orchard Park, NY (US)

( * ) Notice: Subject to any disclaimer, the term of this patent is extended or adjusted under 35 U.S.C. 154(b) by 0 days.

(21) Appl. No.: 10/064,588

(22) Filed: Jul. 29, 2002

(65) Prior Publication Data

US 2004/0018377 A1 Jan. 29, 2004

(51) Int. Cl.⁷ ................................................. B05D 1/36
(52) U.S. Cl. ........................ 427/190; 427/202; 427/203; 427/205
(58) Field of Search ............................... 427/190, 202, 427/203, 205

(56) References Cited

U.S. PATENT DOCUMENTS

| | | | |
|---|---|---|---|
| 5,332,597 A | * 7/1994 | Carolan et al. | 427/243 |
| 5,871,624 A | 2/1999 | Crome | 204/286.1 |
| 5,985,113 A | 11/1999 | Crome et al. | 205/343 |
| 6,284,682 B1 | 9/2001 | Troczynski et al. | 501/12 |
| 6,340,379 B1 | * 1/2002 | Penth et al. | 427/372.2 |
| 6,382,958 B1 | 5/2002 | Bool, III et al. | 431/2 |
| 6,383,350 B1 | 5/2002 | Sehlin et al. | 204/286.1 |
| 6,458,170 B1 | * 10/2002 | Visco et al. | 429/30 |
| 6,485,780 B1 | * 11/2002 | Sangeeta et al. | 427/180 |
| 6,638,400 B2 | * 10/2003 | Riecke | 204/258 |

FOREIGN PATENT DOCUMENTS

FR    2 722 115 A1    1/1996

OTHER PUBLICATIONS

Patent Abst of JP, Apr. 27, 1990, NGK Insulkators, vol 014, no 208.

* cited by examiner

*Primary Examiner*—Archene Turner
(74) *Attorney, Agent, or Firm*—Marsteller & Associates, P.C.

(57) ABSTRACT

A porous ceramic substrate structure (10) having an interior portion (12) formed with an outer surface (14) is porous to at least one selected gas (16). A first ceramic coating layer (18) is applied to the outer surface (14) of the ceramic substrate structure (10) in a suspension state. The first ceramic coating suspension (20) has a desired level of viscosity for application to the substrate and is formed with a ceramic electrolyte powder and at least one organic additive. A second ceramic coating layer (22) is applied to the outer surface (14) following application of the first coating (18). The second coating (22) is initially applied after the first coating (18) and in a suspension state. The ceramic layers (18 and 22) substantially prevent gas leakage through the outer surface (14).

6 Claims, 2 Drawing Sheets

LEAKAGE FREE CERAMIC FILMS FOR POROUS SURFACES

BACKGROUND OF INVENTION

The invention relates to the field of forming structures made from ceramics, and more particularly to a method and article for forming a ceramic film on a ceramic substrate structure to seal the ceramic structure against the passage of a gas through the ceramic structure.

BACKGROUND ART

Successful deposition of leakage-free ceramic films on porous substrates has a significant impact on applications involving gas separations. In the case of separating oxygen from air using solid oxide electrolytes, the oxygen flux is inversely proportional to the thickness of electrolytes, provided that oxygen transport through the dense electrolyte is the rate-limiting factor. Reduced thickness will greatly increase the oxygen flux at the same driving force. Alternatively, operation temperature of the device can be reduced while maintaining the same flux. This is because the higher the temperature, the higher the ionic conductivity of the ionically conducting solid electrolyte. Reduced operation temperature of ceramic oxygen generation systems (COGS) can reduce the material constraints for the COGS hardware. This will reduce capital and maintenance costs for long term operation of oxygen separation units.

Dense films of solid electrolytes have been prepared using a variety of methods, including chemical vapor deposition, magnetron sputtering, and several wet chemical processes. Compared to other processes, wet chemical processes including spraying, spinning, or dipping have advantages of low cost and easy scale-up. In dip coating, a substrate is lifted vertically from a coating bath at a constant withdrawal rate. Of the liquid layer that is lifted out of the bath, there is a boundary layer between the liquid that sticks to the membrane and an outer layer that drains back to the bath.

However, it is quite challenging to obtain leakage-free films using wet chemical processes due, in part, to the binder burn out process, which frequently results in pinholes and micro-cracks in the film.

While the above-cited references introduce and disclose a number of noteworthy advances and technological improvements within the art, none completely fulfills the specific objectives achieved by this invention.

SUMMARY OF INVENTION

In accordance with the present invention, a porous ceramic substrate structure having an interior portion formed with an outer surface that is porous to at least one selected gas. A first ceramic coating layer is applied to at least a portion of the outer surface of the ceramic substrate structure in a slurry type state or suspension of ceramic particles in a liquid binder comprising one or more known additives or organic compounds. The first ceramic coating suspension or slurry has a desired level of viscosity that enables the formation of a substantially uniform coating on the substrate surface and is formed with a ceramic electrolyte powder and at least one organic additive. The ceramic suspension is then dried and sintered with the ceramic substrate structure.

A second ceramic coating layer is then applied again to at least a portion of the outer surface of the ceramic substrate structure following application of the first ceramic coating. The second ceramic coating is initially applied both after the sintering of the first ceramic coating and also in a suspension state. The suspension for the second ceramic coating preferably has a lower viscosity relative to the viscosity of the suspension for the first ceramic coating. A vacuum is applied to the ceramic substrate structure on a side directionally opposite to the first ceramic coating in relation to the outer surface. The vacuum is formed during the application of the second ceramic coating. The ceramic coating layers substantially prevent leakage of the selected gas or gasses through the outer surface originating from the interior portion of the ceramic substrate structure.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

Application Ser. No. 09/626,794, filed Jul. 26, 2000, now U.S. Pat. No. 6,383,350, incorporated herein in its entirety and assigned to the instant assignee, teaches a method and article using thin electrolyte coating on a ceramic support structure.

The present invention describes a coating process that produces gas leakage-free ceramic films F. The process for applying the film F to a ceramic substrate structure 10 may include a dip coating technique combined with the application of a controlled vacuum V to fill pinholes and micro-cracks (not shown) that may exist in the initial coatings on the ceramic substrate structure 10.

Figure 1:
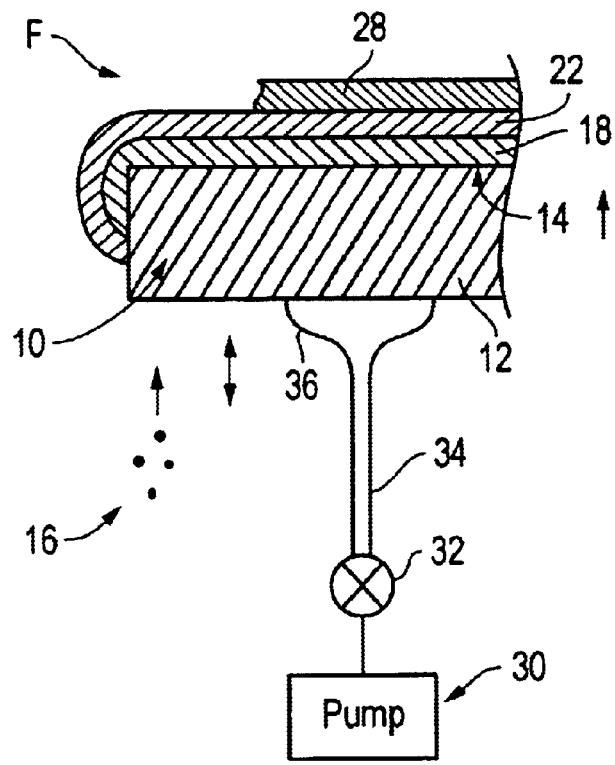
FIG. 1 is a cross section of the ceramic substrate structure with multiple layers comprising the leakage free ceramic film having been applied to the outer surface.
Figure 2:
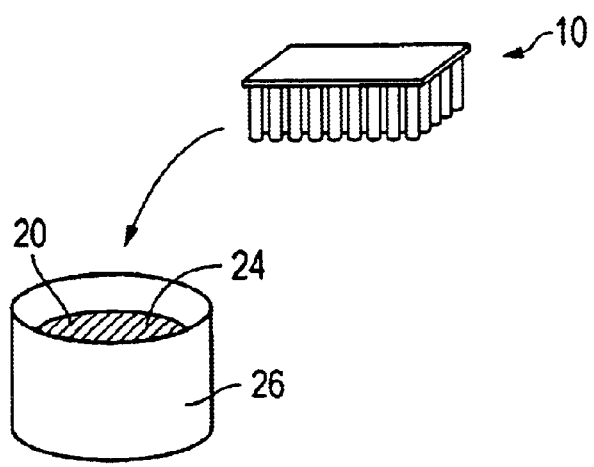
FIG. 2 is a graphical depiction of a ceramic suspension for application to the ceramic substrate structure.
Figure 3:
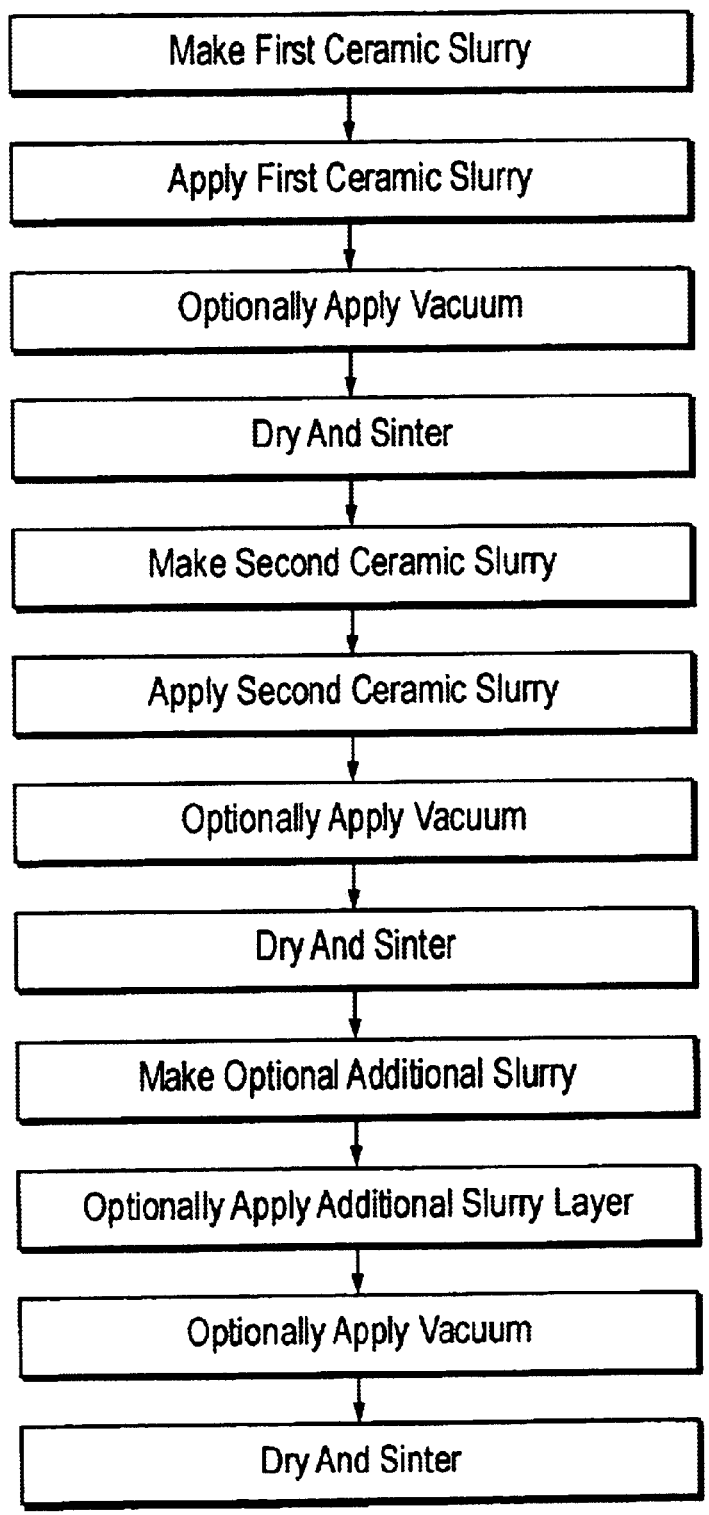
FIG. 3 is a flowchart of the method for applying the ceramic film to a ceramic substrate structure.

Referring particularly to FIG. 1, a porous ceramic substrate structure 10 having an interior portion 12 formed with an outer surface 14 that is porous to at least one selected gas 16. A first ceramic coating layer 18 is applied to at least a portion of the outer surface 14 of the ceramic substrate structure 10 in a slurry type state or a suspension of ceramic particles in a liquid binder agent comprising one or more known additives or organic compounds, see FIG. 2. The first ceramic coating suspension 20 has a desired level of viscosity that is appropriate for application to the substrate. The viscosity and characteristics of the ceramic suspension should permit a substantially uniform application to the surface of the substrate or other body to which the suspension is applied. The ceramic suspension or slurry is formed with a ceramic electrolyte powder and at least one known organic additive. The ceramic suspension 20 is then preferably dried and sintered with and to the ceramic substrate structure 10.

A second ceramic coating layer 22 is then applied again to at least a portion of the outer surface 14 of the ceramic substrate structure 10 following application of the first ceramic coating or layer 18. A vacuum (−2 to −5 psig) is applied to the directionally opposite side of the first coating, prior to the second coating process. The negative pressure at uncoated side of the structure will assist the suspension to flow into pinholes and micro-cracks. The second ceramic coating or layer 22 is initially applied both after a full or partial sintering of the first ceramic coating 18, if such sintering step is performed, and in a suspension state, see FIG. 2. The second suspension 24 for the second ceramic coating 22 has a selected viscosity that preferably may have a lower viscosity relative to the viscosity of the first ceramic coating suspension 20 for the first ceramic coating 18. The ceramic coating layers 18 and 22 substantially prevent leakage of the selected gas or gasses 16 through the outer surface 14 originating from the interior 12 of the ceramic substrate structure 10.

Sintering of the ceramic suspension may be partially done or eliminated depending on the choice of the compounds comprising the suspension so long as the additive binder elements are eliminated or transformed such that the result of the application of the ceramic suspension remains bound to the substrate or earlier ceramic layers.

The dip coating suspension 20 and 24 may be made of a solvent, a ceramic electrolyte powder, and other organic additives, that could include components such as dispersants, binders and plasticizers. For example, a dip coating suspension of $Ce_{0.8}Gd_{0.2}O_2$(CGO) may be prepared by adding the following: toluene, ethanol, butyl benzyl phthalate, polyvinyl butyral, and CGO powder.

The suspension 20 or 24 may be made by combining the above ingredients in a container. The polyvinyl butyral binder is preferably allowed to dissolve before the addition of the ceramic powder. Zirconia grinding media may be added to the container. The suspension 20 or 24 is then ball milled for 16 to 20 hours, for example. The grinding media are removed and the suspension may be placed again on the ball-miller for 4 hours at a slow rotation rate. The suspension 20 or 24 is then transferred into an open tanker or vessel 26. The desired ceramic substrate structure 10, such as a COGS (Ceramic Oxygen Generator System) module, is dipped into the suspension 20 or 24 at a fixed rate.

In a typical process, the structures or modules 10 will stay in the suspension 20 or 24 for a short period and are then lifted up at a fixed rate. Multiple coatings can be applied by repeated dipping and extraction.

The viscosity of the dip coating suspension 20 and 24 will be in a certain range (for example, 50–200 cPs). The porous substrates 10 will be first dipped into a suspension 20 with a medium viscosity. The first coating or layer 18 will then will be dried and subsequently fired or sintered to desired temperature.

There are a number of factors influencing the film thickness and the position of the streamline, including (1) the viscous drag on the liquid by the substrate 10, (2) the force of gravity, (3) the surface tension in the concave meniscus; (4) the internal force of liquid on the substrate 10; (5) the surface tension gradient; and (6) the disjoining pressure. In general, increasing viscosity, velocity of substrate withdrawal from the suspension will increase film thickness and increasing density of suspension and liquid-vapor surface tension will decrease film thickness.

The ceramic substrate structure 10 once having been coated with the suspension 20 or 24 will then be connected to a vacuum on the uncoated side. This vacuum will be relatively low (for example, in the range of −2 to −5 psig). The coated side will be dipped into another suspension 24 that has a viscosity slightly lower than the suspension 20 used in the previous step, for a relatively short time. Because of the negative pressure at the uncoated side, suspension will be able to flow or follow into relatively large pinholes and micro-cracks. The coated ceramic substrate structure 10 will then be dried and sintered.

The next step of this coating process may be applying a suspension with a relatively low viscosity for a third 28 or possible subsequent film layer adhered to the ceramic substrate structure 10. A vacuum V will preferably once again be connected to the uncoated side or interior 12 of the ceramic substrate structure 10. This vacuum desirably has a smaller negative pressure than that in the previous step. Since the suspension is more dilute, smaller through-pinholes and through-micro-cracks can be filled at this step. Again this coating will be dried and sintered.

The vacuum V may be connected to the uncoated side or interior 12 of the ceramic substrate structure 10 with a known vacuum pump 30 connected to an optional valve 32 and hose 34. The valve 32 may be used to control the application of the vacuum V to the ceramic structure 10. The vacuum V may be applied to the ceramic substrate 10 with a connection 36 operably joining the vacuum pump 30 to the uncoated side or interior 12 of the ceramic structure 10.

Additional layers of coating may be added as necessary in order to achieve a leakage free film. Each subsequent coating will preferably use a suspension less viscous than the suspension used in the previous step and a vacuum with less negative pressure than the pressure used in the previous step.

The foregoing disclosure and description of the invention are illustrative and explanatory thereof, and various changes in the size, shape and materials, as well as in the details of the illustrated construction may be made without departing from the spirit of the invention.

What is claimed is:

1. A method of manufacturing a ceramic film for reducing leakage of a selected gas through an outer surface of a porous ceramic substrate structure having an interior portion formed with the outer surface; the substrate being porous to at least one selected gas comprising:

applying a first ceramic coating layer to at least a portion of the outer surface of the ceramic substrate structure; the first ceramic coating being initially applied in a suspension state, the first ceramic coating suspension having a desired level of viscosity for substantially uniform application to the surface; and being formed with a ceramic electrolyte powder and at least one organic additive; and applying a second ceramic coating layer to at least a portion of the outer surface of the ceramic substrate structure following application of the first ceramic coating and subsequent to a drying process of the first ceramic coating; the second ceramic coating being initially applied subsequent to application of the first ceramic coating; the second ceramic coating being initially applied in a suspension state having a lower viscosity relative to the viscosity of the suspension used for the first coating.

2. The method of claim 1 further including applying a third ceramic coating layer to at least a portion of the outer surface of the ceramic substrate structure following application of the second ceramic coating; the third ceramic coating being initially applied subsequent to applying the second ceramic coating; the third ceramic coating being initially applied as a suspension having a lower viscosity relative to the viscosity of the second ceramic coating.

3. The method of claim 1 wherein a vacuum is applied to the ceramic substrate structure on a side directionally opposite to the first ceramic coating in relation to the outer surface; the vacuum is formed during the application of the ceramic coating to the ceramic substrate structure while the ceramic coating is in a suspension state.

4. The method of claim 1 wherein the first ceramic coating comprises toluene, ethanol, butyl benzyl phthalate, polyvinyl butyral, and a powder of $Ce_{0.8}Gd_{0.2}O_2$(CGO).

5. The method of claim 1 wherein the ceramic coating layers are applied to the ceramic substrate by dipping a portion of the ceramic substrate into the desired suspension.

6. The method of claim 1 wherein the viscosity of the ceramic coating suspension is in the range of 50–200 cPs.

* * * * *